United States Patent
Eisner et al.

(10) Patent No.: US 8,209,667 B2
(45) Date of Patent: Jun. 26, 2012

(54) SOFTWARE VERIFICATION USING HYBRID EXPLICIT AND SYMBOLIC MODEL CHECKING

(75) Inventors: Cynthia Rae Eisner, Zichron Yaacov (IL); Ziv Glazberg, Haifa (IL); Sharon Keidar-Barner, Yokne'am Ilit (IL); Ishai Rabinovitz, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 1681 days.

(21) Appl. No.: 11/329,535

(22) Filed: Jan. 11, 2006

(65) Prior Publication Data
US 2007/0168988 A1    Jul. 19, 2007

(51) Int. Cl.
*G06F 9/44*    (2006.01)
*G06F 11/00*    (2006.01)
(52) U.S. Cl. ........ 717/126; 717/124; 717/132; 714/38.1
(58) Field of Classification Search ........................ None
See application file for complete search history.

(56) References Cited

U.S. PATENT DOCUMENTS

| | | | | |
|---|---|---|---|---|
| 5,790,778 A * | 8/1998 | Bush et al. | ............ | 714/38.1 |
| 5,857,071 A * | 1/1999 | Haley et al. | ............ | 714/38.1 |
| 6,102,968 A * | 8/2000 | Colby et al. | ............ | 717/126 |
| 6,289,502 B1 * | 9/2001 | Garland et al. | ............ | 717/104 |
| 6,343,376 B1 * | 1/2002 | Saxe et al. | ............ | 717/154 |
| 6,408,430 B2 * | 6/2002 | Gunter et al. | ............ | 717/109 |
| 6,698,012 B1 * | 2/2004 | Kossatchev et al. | ............ | 717/126 |
| 7,089,537 B2 * | 8/2006 | Das et al. | ............ | 717/132 |
| 7,146,605 B2 * | 12/2006 | Beer et al. | ............ | 717/126 |
| 7,536,602 B2 * | 5/2009 | Dams | ............ | 714/38.1 |
| 7,844,951 B2 * | 11/2010 | Chen et al. | ............ | 717/124 |
| 2005/0010907 A1 * | 1/2005 | Namjoshi | ............ | 717/124 |
| 2006/0218534 A1 * | 9/2006 | Kahlon et al. | ............ | 717/124 |
| 2006/0253739 A1 * | 11/2006 | Godefroid et al. | ............ | 714/38 |
| 2011/0071809 A1 * | 3/2011 | Keidar-Barner et al. | ............ | 703/6 |
| 2011/0138362 A1 * | 6/2011 | Keidar-Barner et al. | ............ | 717/126 |

OTHER PUBLICATIONS

J.M Cobleigh, L.A. Clarke and L.J. Osterwell "Flavers: a finite state verification technique for software systems," in vol. 41 of IBM Systems Journal, pp. 140-165, 2002.*

Godefroid, P., et al., DART: Directed Automated Random Testing, Proceeding of the 2005 ACM SIGPLAN Conference on Programming Language Design and Implementation, 2005, pp. 213-223.*

Sen, K., et al. CUTE: A Concolic Unite Testing Engine for C, Proceeding of the 10th European Software Engineering Conference Held Jointly with 13th ACM SIGSOFT International Symposium on Foundations of Software Engineering, 2005, pp. 263-272.*

(Continued)

*Primary Examiner* — Thuy Dao
*Assistant Examiner* — Todd Aguilera
(74) *Attorney, Agent, or Firm* — Daniel Kligler

(57) ABSTRACT

A computer-implemented method for verifying a target system includes defining a specification including properties applicable to the target system. Execution sequences of the target system are identified. A set of the execution sequences is grouped into an equivalence class characterized by a common control flow. A symbolic representation of the equivalence class is evaluated so as to verify a compliance of the set of the execution sequences with one or more of the properties.

21 Claims, 4 Drawing Sheets

FIG. 1

OTHER PUBLICATIONS

Barner, S., et al., "ExpliSAT: Guiding SAT-Based Software Verification with Explicit States", Lecture Notes in Computer Science, Hardware and Software, Verification and Testing [online], 2006 [retrieved Sep. 2, 2012], Retrieved from Internet: <http://citeseerx.ist.psu.edu/viewdoc/download?doi=10.1.1.120.8013&rep=rep1 &type=pdf>, pp. 139-154.*

Barner, S., et al., "ExpliSAT—Guiding SAT-based Software Verification with Explicit States" [online], 2006 [retrieved Sep. 2, 2012], Retrieved from Internet: <http://researchweb.watson.ibm.com/haifa/Workshops/verification2006/present/sharon.pdf>, pp. 1-25.*

Brat, G., et al., "Java Path Finder—Second Generation of a Java Model Checker", Proceedings of the Workshop on Advances in Verification [online], 2000, [retrieved Sep. 2, 2012], Retrieved from Internet: <http://citeseerx.ist.psu.edu/viewdoc/download?doi=10.1.1.36.5740&rep=rep1 &type=pdf>, pp. 1-7.*

Clarke et al., "A Tool for Checking ANSI-C Programs," Tenth International Conference on Tools and Algorithms for the Construction and Analysis of Systems (TACAS), Barcelona, Spain, Mar. 29-Apr. 2, 2004, pp. 168-176.

Rabinovitz and Grumberg, "Bounded Model Checking of Concurrent Programs," Proceedings of the Seventeenth International Conference on Computer Aided Verification (CAV), Edinburgh, Scotland, UK, Jul. 6-10, 2005, pp. 82-97.

S. Barner, Z. Glazberg and I. Rabinovitz, "Wolf—Bug Hunter for Concurrent Software using Formal Methods," Proceedings of the Seventeenth International Conference on Computer Aided Verification (CAV), Edinburgh, Scotland, UK, Jul. 6-10, 2005, pp. 151-157.

S. Barner and I. Rabinovitz, Efficient Symbolic Model Checking of Software using partial disjunctive partioning, CHARME, p. 35-50, 2003.

Microsoft Zing, details at www.research.microsoft.com/zing, Access Date Jan. 11, 2006.

Holzmann in "The Model Checker Spin," IEEE Transactions on Software Engineering, (23:5), May 1997, pp. 1-17.

Spin (Open Source), details at www.spinroot.com, Access Date Jan. 11, 2006.

Khurshid et al., in "Generalized Symbolic Execution for Model Checking and Testing," Ninth International Conference on Tools and Algorithms for the Construction and Analysis of Systems (TACAS), Warsaw, Poland, Apr. 7-11, 2003.

* cited by examiner

```
1   a=5;
2   b=0;
3   if(a>0)
4   a=input();
5   if(a≤1)
6   c=a+2;
7   a=input();
8   if(a>4)
9   assert(c<3);
18  }
```

```
1   a=5;
2   b=0;
3   if(a>0)
4   a=input();
5   if(a≤1)
6   c=a+2;
7   a=input();
8   if(a>4)
9   assert(c<3);
18  }
```

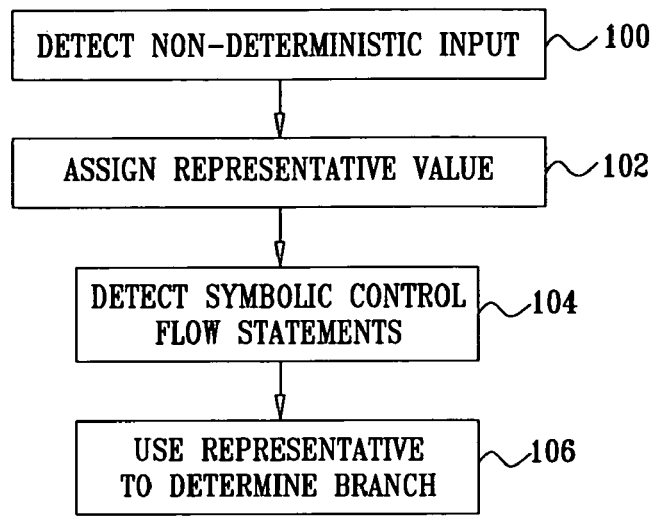
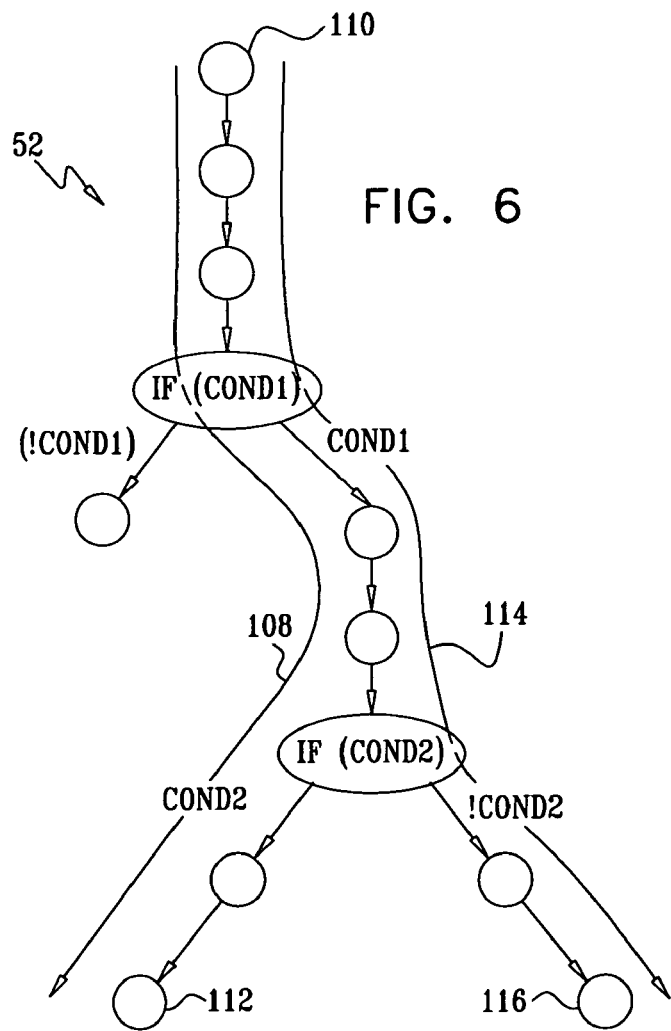

SOFTWARE VERIFICATION USING HYBRID EXPLICIT AND SYMBOLIC MODEL CHECKING

FIELD OF THE INVENTION

The present invention relates generally to software verification, and particularly to methods and systems for verifying computer programs using a combination of explicit and symbolic model checking.

BACKGROUND OF THE INVENTION

Various methods and tools are known in the art for verifying computer programs. Some methods and tools use explicit model checking, which explicitly represents and traverses a state space representation of the computer program. For example, Microsoft Corp. (Redmond, Wash.) offers a software model checking tool called Zing. Zing comprises a modeling language for expressing executable concurrent models of software, a model checking infrastructure for exploring the state space of Zing models, as well as support infrastructure for generating Zing models automatically from common programming languages.

Another example of an explicit model checker is an open source tool called Spin. Spin is described, for example, by Holzmann in "The Model Checker Spin," IEEE Transactions on Software Engineering, (23:5), May 1997, pages 1-17.

Some software verification tools use symbolic model checking methods, such as methods based on propositional satisfiability (SAT), in which the verified computer program is expressed as a Boolean formula that is evaluated by a SAT solver. For example, Clarke et al. describe a verification tool called C-language Bounded Model Checker (CBMC) in "A Tool for Checking ANSI-C Programs," Tenth International Conference on Tools and Algorithms for the Construction and Analysis of Systems (TACAS), Barcelona, Spain, Mar. 29-Apr. 2, 2004, pages 168-176.

Some symbolic model checking methods and tools use binary decision diagrams (BDD). For example, Barner et al. describe a BDD-based symbolic model checker in "Wolf—Bug Hunter for Concurrent Software using Formal Methods," Proceedings of the Seventeenth International Conference on Computer Aided Verification (CAV), Edinburgh, Scotland, UK, Jul. 6-10, 2005, pages 151-157.

Some model checking methods and tools are used for verifying concurrent computer programs. For example, Rabinovitz and Grumberg describe a SAT-based bounded verification technique called Threaded-CBMC (TCBMC), in "Bounded Model Checking of Concurrent Programs," Proceedings of the Seventeenth International Conference on Computer Aided Verification (CAV), Edinburgh, Scotland, UK, Jul. 6-10, 2005, pages 82-97. TCBMC, which is based on the CBMC tool cited above, performs verification of threaded C programs.

Another symbolic execution method is described by Khurshid et al., in "Generalized Symbolic Execution for Model Checking and Testing," Ninth International Conference on Tools and Algorithms for the Construction and Analysis of Systems (TACAS), Warsaw, Poland, Apr. 7-11, 2003. First, the program is instrumented with a source-to-source translation. The translation enables standard model checkers to perform symbolic execution of the program. Then, a symbolic execution algorithm that handles dynamically allocated structures, method preconditions, data and concurrency is applied.

SUMMARY OF THE INVENTION

There is therefore provided, in accordance with an embodiment of the present invention, a computer-implemented method for verifying a target system. The method includes defining a specification including properties applicable to the target system. Execution sequences of the target system are identified. A set of the execution sequences is grouped into an equivalence class characterized by a common control flow. A symbolic representation of the equivalence class is evaluated so as to verify a compliance of the set of the execution sequences with one or more of the properties.

Apparatus and computer software product for verifying a target system are also provided.

There is additionally provided, in accordance with an embodiment of the present invention, a method for evaluating a target system. The method includes traversing a graph representing the target system, the graph including execution sequences. An instruction including an assignment of a non-deterministic value to a variable is detected in the execution sequences. A representative numerical value is assigned to the variable. When detecting a subsequent conditional control flow instruction related to the variable, a continued traversal of the graph is determined responsively to the representative numerical value. The execution sequences of the target system are determined responsively to the traversal of the graph.

The present invention will be more fully understood from the following detailed description of the embodiments thereof, taken together with the drawings in which:

BRIEF DESCRIPTION OF THE DRAWINGS

FIG. 5 is a flow chart that schematically illustrates a method for traversing a control graph, in accordance with an embodiment of the present invention; and FIG. 6 is a state diagram that schematically illustrates a control graph, in accordance with an embodiment of the present invention.

DETAILED DESCRIPTION OF EMBODIMENTS

Overview

Verification methods and tools based on explicit model checking typically traverse the entire state space of execution sequences and variable values of the verified program. The state space to be explored is often extremely large and complex, especially for programs that handle non-deterministic input (e.g., input provided by a user).

Some verification methods and tools based on symbolic model checking, such as the CBMC tool cited above, attempt to express the entire program as a Boolean formula and solve this formula using a SAT solver. The formula ultimately provided to the solver is often extremely complicated, which significantly increases the verification time. In some cases, the solver is unable to handle the size of the formula, which limits the maximum program size that can be verified. Moreover, some symbolic model checking methods, and in particular SAT-based methods, are often limited to bounded-length loops and recursions and to a bounded heap size. For example, SAT-based methods typically require the length of the program run to be bounded in order to translate the program into a finite Boolean formula.

In view of these limitations of known explicit and symbolic model checking, embodiments of the present invention provide methods and tools for verifying computer programs using a hybrid of explicit and symbolic model checking. As will be described in detail below, the various execution sequences of the verified program are grouped into equivalence classes, each having a common control flow. In other words, all execution sequences of the program that have a particular control flow, regardless of data differences, are grouped into a single equivalence class.

The execution sequences associated with each equivalence class (i.e., associated with a particular control flow) are then collectively verified by evaluating a symbolic representation of the equivalence class. In some embodiments, the symbolic representation comprises a logical formula, which is evaluated using a SAT solver.

In some embodiments, the possible control flow sequences of the verified program are represented as a control graph, in which the equivalence classes correspond to different control paths through the graph. Several methods for traversing the control graph are described. In some embodiments, unused control paths are avoided by means of representative value assignments, as will be described below. The disclosed methods are extended to the case of concurrent programs.

Unlike some known symbolic verification methods, the hybrid methods described herein apply symbolic model checking to simpler, smaller-size symbolic representations or formulas, thus enabling the verification of complex computer programs within reasonable time and computational complexity. Furthermore, no upper bound is imposed on the number of iterations in loops and recursions.

System Description

Figure 1:
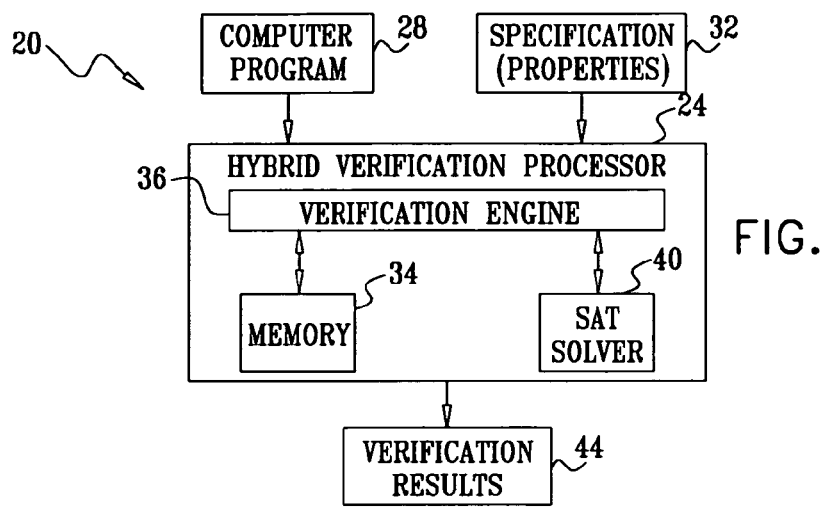
FIG. 1 is a block diagram that schematically illustrates a system for software verification, in accordance with an embodiment of the present invention.

FIG. 1 is a block diagram that schematically illustrates a system 20 for software verification, in accordance with an embodiment of the present invention. System 20 comprises a hybrid verification processor 24. Processor 24 accepts a computer program 28 and a specification 32, typically comprising a set of properties. Processor 24 verifies that program 28 complies with the properties defined in specification 32, a process often referred to as formal verification. In some embodiments, the properties are associated with specific locations in program 28 and are embedded in the program code, such as using embedded assert( ) C-language statements.

Processor 24 comprises a memory 34 that holds program 28 and specification 32, and a verification engine 36, which carries out the formal verification methods described herein. Processor 24 also comprises a symbolic model checker, such as a propositional satisfiability (SAT) solver 40, which is invoked by engine 36 to evaluate Boolean formulas, as will be explained below.

Solver 40 may comprise any suitable SAT solver known in the art, such as the Chaff solver, which is described by Moskewicz et al. in "Chaff: Engineering an Efficient SAT Solver," Proceedings of the 38$^{th}$ Annual IEEE/ACM Design Automation Conference (DAC'2001), Las Vegas, Nev., June 2001. Many SAT solving methods are based on variants of the well-known Davis-Putnam-Longman-Loveland (DPLL) algorithm, which is described by Davis et al. in "A machine program for theorem-proving," Communications of the ACM, (5:7), pp. 394-397, July 1962. Alternatively, the symbolic model checker may apply any other suitable symbolic model checking method, such as, for example, BDD-based methods.

In some embodiments, hybrid verification processor 24 may comprise one or more CPUs, located in a single computer or in a number of interconnected computers. Typically, engine 36 and SAT solver 40 comprise general-purpose computers, which are programmed in software to carry out the functions described herein. The software may be downloaded to the computers in electronic form, over a network, for example, or it may alternatively be supplied to the computers on tangible media, such as CD-ROM. Further alternatively, elements of engine 36 and/or solver 40 may be implemented using a combination of hardware and software elements. The verification engine and solver may comprise standalone units, or may alternatively be implemented as different processes or programs running on a single computing platform.

Although the embodiments described hereinbelow mainly address the use of hybrid symbolic and explicit model checking for verifying software, the methods and systems described herein can also be used for verifying other kinds of target systems. In particular, the disclosed methods and tools can be used for verifying complex hardware systems having non-deterministic characteristics and/or subjected to non-deterministic external conditions and inputs. Therefore, program 28 can be viewed as an example of a target system, or a model of such a system, that can be verified using the methods and tools described herein.

Verification Method Description

Processor 24 verifies program 28 using a hybrid process, which combines explicit and symbolic model checking. In principle, the hybrid methods described herein review the various possible execution sequences of program 28. An execution sequence is defined in this context as a sequence of program instructions carried out in a particular order. Program 28 typically comprises multiple execution sequences, some of which may follow a common control flow even though the data involved (e.g., values assigned to variables along the execution) may be different.

The execution sequences are grouped into equivalence classes having a common control flow. In other words, all execution sequences of the program that have a particular control flow, regardless of data differences, are grouped into a single equivalence class. The execution sequences associated with a particular equivalence class (i.e., associated with a particular control flow) are then represented by a single symbolic representation, such as a logical formula. The symbolic representation is evaluated, so as to verify all execution sequences associated with the equivalence class simultaneously.

In some embodiments, the collection of equivalence classes of program 28 are represented as a directed graph, referred to herein as the control graph of the program. The control graph comprises vertices, referred to as control states, which correspond to the instructions of program 28. Possible transitions from one instruction to another are represented by arcs of the control graph. Thus, each possible control flow sequence in program 28 is represented by a path through the control graph, referred to as a control path.

The concept of execution sequences, their grouping into equivalence classes, as well as additional aspects of the methods described hereinbelow will be demonstrated using the following exemplary C-language program 28. The program instructions are numbered for ease of reference in the description that follows.

```
1       a = 5;
2       b = 0;
3       if (a > 0){
4           a = input( );
5           if (a <= 1){
6               c = a + 2;
7               a = input( )
8               if (a > 4) {
9                   assert(c   <   3);
10              }
11              else {
12                  b = 1;
13              }
14          }
15          if (a <= 1) {
16              a = 2;
17          }
18      }
19      assert(b == 1);
```

Figure 2:
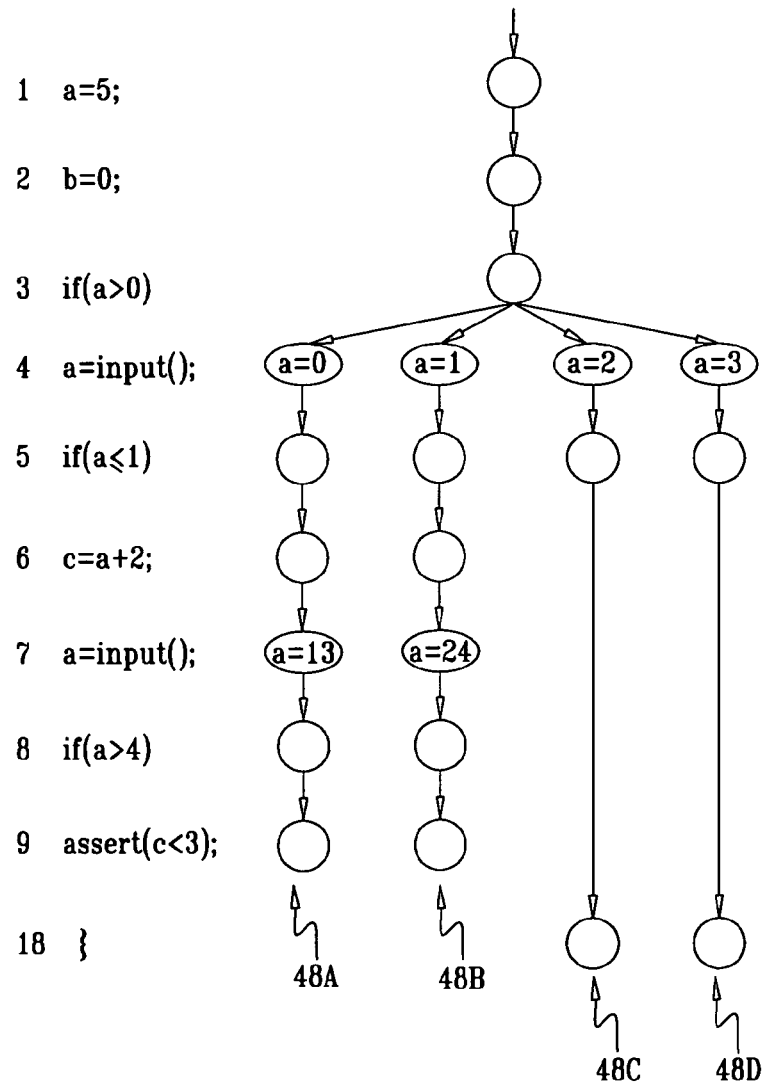
FIG. 2 is a state diagram that schematically illustrates execution sequences of a computer program, in accordance with an embodiment of the present invention.

FIG. 2 is a state diagram that schematically illustrates execution sequences 48 of the exemplary computer program 28 given above, in accordance with an embodiment of the present invention. The figure shows four execution sequences 48 denoted 48A, ..., 48D, represented as paths that transition from one program instruction to another. (Additional execution sequences are possible in program 28. Only four sequences are shown, however, for the sake of clarity. Note also that not all instructions are reached by these four execution sequences.)

The term "execution sequence" is used herein to describe both full execution sequences of the program, which start at the initial program instruction and end when the program terminates, as well as partial execution sequences. Partial execution sequences comprise sequences that end at any desired program instruction. Partial execution may thus be viewed as prefixes of full executions.

It can be seen that some execution sequences share a common control flow. For example, sequences 48A and 48B have the same control flow, following the instruction sequence {1,2,3,4,5,6,7,8,9}. Sequences 48C and 48D also share the same control flow {1,2,3,4,5,18}, which is different from the control flow of sequences 48A and 48B. The two different control flows are determined in this example by the different results of the if statement in line 5, which depends on the value assigned to variable a at line 4 by the user input. Note the differences in variable values between sequences having the same control flow.

Figure 3:
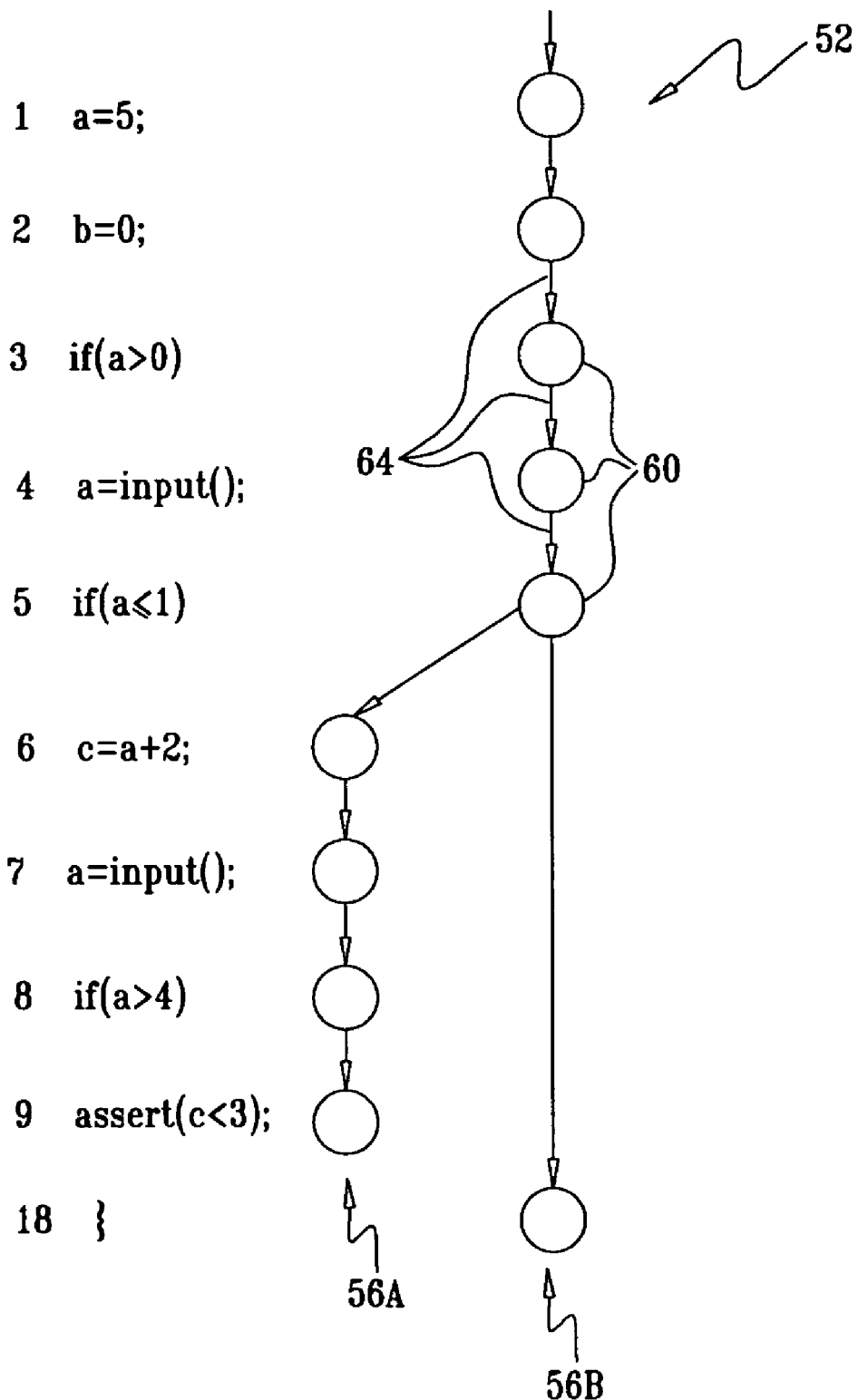
FIG. 3 is a state diagram that schematically illustrates a control graph of a computer program, in accordance with an embodiment of the present invention.

FIG. 3 is a state diagram that schematically illustrates a control graph 52 of the exemplary execution sequences 48A, ..., 48D of FIG. 2 above, in accordance with an embodiment of the present invention. Graph 52 represents a grouping of execution sequences 48A, ..., 48D into two equivalence classes, each having a common control flow. Each equivalence class is represented by a control path 56 through graph 52. Graph 52 comprises control states 60 corresponding to the program instructions, and transitions 64 indicating control flow from one control state 60 to another.

In the present example, execution sequences 48A and 48B (as well as any other execution sequence having the same control flow as sequences 48A and 48B) are grouped into a single equivalence class, represented as a control path 56A. Similarly, sequences 48C and 48D are grouped to form control path 56B.

In the description that follows, consider the two control paths {1,2,3,4,5,6,7,8,9} and {1,2,3,4,5,6,7,8,11,12 } in the exemplary program 28, denoted PATH1 and PATH2, respectively:

```
PATH1:  1    a = 5;
        2    b = 0;
        3    if (a > 0){
        4        a = input( );
        5        if (a <= 1){
        6            c = a + 2;
        7            a = input( )
        8            if (a > 4) {
        9                assert(c < 3);
PATH2:  1    a = 5;
        2    b = 0;
        3    if (a > 0){
        4        a = input( );
        5        if (a <= 1){
        6            c = a + 2;
        7            a = input( )
        8            if (a > 4) {
        11           else {
        12               b = 1;
```

Each control path comprises three types of relationships, or constraints, which affect its verification. These constraints are referred to as control flow constraints, value assignments and verification properties. In some embodiments, verification engine 36 of processor 24 traverses each control path and constructs a logical formula (referred to herein as a path formula) that accounts for all the constraints that appear along the path. The path formula typically comprises a Boolean expression defined over variables of program 28. Typically, the path formula is expressed in a conjunctive normal form (CNF), i.e., as a conjunction (AND) of Boolean constraints. The path formula can be viewed as a symbolic representation of all execution sequences associated with the control path.

The path formula is solved by SAT solver 40 in order to verify or find program errors in the control path. As will be explained below, finding a satisfying assignment that solves the path formula is possible if and only if there exists an execution sequence associated with the control path that violates at least one of the verification properties.

Control flow constraints comprise the logical conditions defined by the control flow instructions (e.g., if statements) along the path. For example, in order for PATH1 to be taken, (a>0) should be true at line 3, (a<=1) should be true in line 5 and (a>4) should be true at line 8. Similarly, in order for PATH2 to be taken, (a>0) should be true at line 3, (a<=1) should be true at line 5 and (a>4) should be false at line 8. These constraints are referred to as control flow constraints.

When constructing the path formula of a particular control path, value assignments to a particular variable performed at different stages of the execution should not be confused with one another. For this purpose, in some embodiments, value assignments along each control path are converted to an equivalent form referred to as a static single assignment (SSA) representation.

In the SSA representation, successive assignments to a particular variable are replaced by assigments to newly-defined variables. Each newly-defined variable is assigned a value only once. Typically, the newly-defined variables carry the same name as the original variable, with an additional incrementing index. References to the variable along the path should take into account the proper indexing. For example, the following code shows the SSA representations of control paths PATH1 and PATH2 defined above:

```
PATH1:   1     a1 = 5;
(SSA)    2     b1 = 0;
         3     if (a1 > 0){
         4         a2 = input( );
         5         if (a2 <= 1){
         6             c1 = a2 + 2;
         7             a3 = input( )
         8             if (a3 > 4) {
         9                 assert(c1 < 3);
PATH2:   1     a1 = 5;
(SSA)    2     b1 = 0;
         3     if (a1 > 0){
         4         a2 = input( );
         5         if (a2 <= 1){
         6             c1 = a2 + 2;
         7             a3 = input( )
         8             if (a3 > 4) {
         11        else {
         12            b2 = 1;
```

In some embodiments, engine 36 adds to the path formula a conjugation of the control flow constraints that should be kept by all execution sequences associated with the control being processed. For example, the control flow constraints applicable to control path PATH1 are given by (flow)=(a1>0)∧(a2<=1)∧(a3>4), wherein the symbol ∧ denotes the Boolean AND operator. Similarly, the control flow constraints applicable to PATH2 are given by (flow)=(a1>0)∧(a2<=1)∧!(a3>4), wherein the symbol ! denotes the Boolean NOT operator.

In addition to the control flow constraints, the path formula of each control path also accounts for values assigned to program variables along the path. Values may be assigned to a variable using, for example, an explicit assignment (e.g., the a=5 statement in line 1) or using an implicit assignment that depends on another variable (e.g., the c=a+2 statement in line 6). Alternatively, a value may be assigned to a variable using input accepted from the user (e.g., the a=input( ); statement in line 4). In some embodiments, engine 36 adds the variable value assignments along the control path as constraints to the path formula.

In the context of the present patent application, we shall make the following distinction between symbolic and explicit values assigned to variables. A variable is said to have an explicit value within a particular control path if its value is deterministic (i.e., remains the same) for all execution sequences associated with the control path. By contrast, a variable has a symbolic value if the assigned value may differ from one execution sequence to another within the control path. Note that the classification of a value as symbolic or explicit is performed within the scope of a particular control path.

In particular, a symbolic value is given to a variable when the variable is assigned its value responsively to user input, such as in the a=input( ); statement in line 4. In such cases, engine 36 typically notes that the variable value is symbolic, and that subsequent constraints based on this value should also be treated as symbolic.

In some cases, it is possible to have an explicit value that depends on non-deterministic data. For example, consider the b2=1 assignment in line 12 of PATH2. If the value given to a at the a=input( ) statement of line 4 would have been equal to or smaller than 1, then the if statement at line 5 would have caused the execution to diverge to a different control path that does not include line 12. Thus, within control path PATH2, the b2=1 assignment assigns an explicit value, even though it depends on non-deterministic data in the context of the entire program.

The task of verifying that a particular value is explicit is a highly computationally-intensive task. A good approximation can be achieved, however, using syntactic analysis of the value assignments. In some embodiments, engine 36 analyzes the syntax of previous value assignments in order to estimate whether a particular value is explicit or symbolic. For example, if a value is assigned to a variable from user input or from another symbolic value, the assigned value is considered symbolic.

In some embodiments, control flow constraints that depend on explicit values may be omitted from the path formula. For example, in both PATH1 and PATH2, the control flow constraint (a1>0) in line 3 is always met, since it depends on the a=5 explicit assignment in line 1. Therefore, this constraint can be omitted from the path formulas of PATH1 and PATH2, further simplifying the formula solved by solver 40.

Referring to PATH1, for example, the only symbolic value assignment along this path is c1=a2+2 at line 6. Thus, when constructing the path formula of PATH1, engine 36 adds the constraint (c1=a2+2) to the formula in order to account for this value assignment constraint.

In addition to the control flow and value assignment constraints, engine 36 adds to the path formula constraints related to verification properties inserted along the control path. In some embodiments, such as in the exemplary program 28 above, the program comprises assert(cond) statements, wherein cond denotes a logical condition that defines a property to be verified when the execution reaches the assert statement. For example, the assert(c<3) statement in line 9 causes an error message or a similar alert notification if the condition is not met, i.e., if c>=3.

In some embodiments, for each verification property along the control path, engine 36 constructs a temporary path formula comprising the control flow and value assignment constraints accumulated up to this point. Engine 36 adds to the temporary formula a constraint comprising a negation (i.e., logical NOT) of the property. For example, when constructing the path formula of PATH1, engine 36 adds a conjunction with the constraint !(c1<3) to the formula.

In some cases, a particular control path may have several assert(cond) statements along the path. In such cases, for each assert(cond) statement, the respective property should only be verified in the prefix of this control path ending in the assert statement (i.e., for the partial executions preceding the assert (cond) statement). Thus, when a control path has two or more assert(cond) statements, engine 36 constructs a separate temporary path formula for verifying each control path prefix, thus verifying each assert(cond) statement separately against the constraints that precede it in the control graph.

In summary, for each control path 52, engine 36 produces a path formula given by path=(flow)∧(SSA)∧(!property), wherein (flow) denotes a conjunction of the control flow constraints and (SSA) denotes a conjunction of the value assignment constraints.

The term (!property) denotes a negation of the verification property being verified using the path formula. As noted above, each property is typically verified separately using a temporary path formula. It is possible, however, to modify the method so as to verify two or more properties along the control path using a single path formula. In such embodiments, the term (!property) denotes a negation of the conjunctions of these properties, i.e., a term having the form !(property1∧property2∧ . . . ).

In some embodiments, the path formula comprises a symbolic Boolean formula, defined over one or more of the variables of program 28. For example, the path formula produced for PATH1 above is given by path=(a2<=1)∧(a3>4)∧(a1=5)∧(b1=0)∧(c1=a2+2)∧! (c1<3).

Engine 36 invokes SAT solver 40 in order to solve the path formula. SAT solver 40 traverses possible value assignments to the variables of the path formula in search of an assignment that satisfies the formula. As noted above, solver 40 may apply any suitable SAT solving method known in the art. In some embodiments, solver 40 comprises a known SAT solver, such as the Chaff SAT solver cited above.

If a satisfying assignment is found by solver 40, this assignment means that there exists an execution sequence that meets all control flow and value assignment constraints, while simultaneously violating at least one of the property constraints. In other words, finding a satisfying assignment to the path formula is synonymous with finding a program error in the control path being verified.

As noted above, any other suitable method can be used to construct and evaluate a symbolic representation of the traversed control path. For example, when the symbolic model checker comprises a BDD-based checker, the model checker can translate the path formula into a BDD, or otherwise construct a BDD that corresponds to the control path. If the resulting BDD is empty, the property holds for all execution sequences. A non-empty BDD corresponds to a violated property in at least one of the execution sequences. Alternatively, any other suitable method of applying BDDs to verify the control path can be used.

Figure 4:
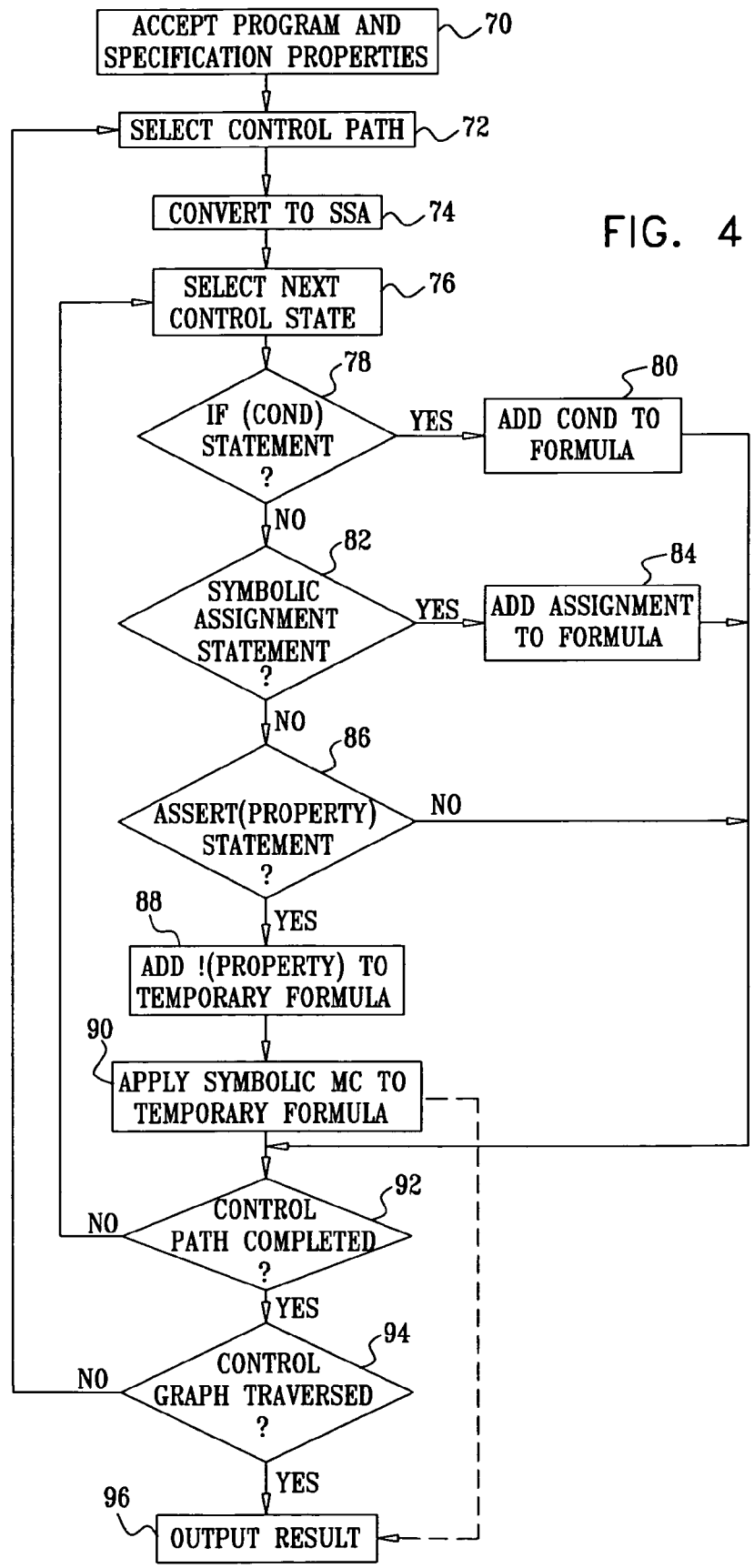
FIG. 4 is a flow chart that schematically illustrates a method for software verification, in accordance with an embodiment of the present invention.

FIG. 4 is a flow chart that schematically illustrates the software verification method described above, carried out by hybrid verification processor 24, in accordance with an embodiment of the present invention. The method begins with processor 24 accepting program 28 and specification 32, at an input step 70. Processor 24 stores program 28 and specification 32 in memory 34. In the present example, the verification properties of specification 32 are embedded as assert (property) statements in the code of program 28.

In steps 72-94 below, the method traverses control graph 52 of program 28, verifying one control path 56 at a time. Verification engine 36 selects a control path to verify, at a path selection step 72. Exemplary methods for traversing the control graph and for selecting control paths are described in FIGS. 5 and 6 below. Alternatively, engine 36 may traverse control paths 56 of graph 52 at any suitable order and/or using any suitable selection process. In some embodiments, only a part of the control path may be traversed.

Having selected a control path to be verified, engine 36 translates the program instructions along the path to the equivalent SSA form, as described above, in an SSA conversion step 74. Engine 36 then traverses the selected control path and accumulates a path formula for this path.

Engine 36 selects a control state 60 to be processed, at a control state selection step 76. Typically, the next control state corresponds to the next program instruction to be executed, in accordance with the control flow of the control path being traversed.

Engine 36 checks whether the program instruction being processed comprises a control flow (if) statement, at a branch checking step 78. If the instruction comprises an if(cond) statement, engine 36 adds a corresponding control flow constraint to the path formula, at a control flow constraint addition step 80.

Otherwise, engine 36 checks whether the program instruction comprises a symbolic value assignment statement, at an assignment checking step 82. If the instruction comprises a symbolic assignment, engine 36 adds a corresponding value assignment constraint to the path formula, at an assignment constraint addition step 84. In some embodiments, if the symbolic value assignment comprises a non-deterministic input statement (e.g., an input( ) statement), engine 36 does not add any constraints to the formula, since the value input by the user is unconstrained. The engine notes, however, the fact that the variable in question was assigned a symbolic value, so that subsequent constraints based on this variable can be treated as symbolic.

Otherwise, engine 36 checks whether the program instruction comprises an assert(property) statement, at a property checking step 86. If the instruction comprises an assert statement, engine 36 constructs a temporary path formula and adds a verification property constraint of the form ! (property) to the temporary formula, at a property constraint addition step 88.

Engine 36 now invokes SAT solver 40 in order to solve the temporary path formula, at a formula solving step 90. Solver 40 attempts to find a satisfying assignment to the temporary path formula. The solver produces verification result 44, which may comprise the satisfying assignment, or an indication that no such assignment could be found. As noted above, a satisfying assignment corresponds to a program error (property violation) in the currently-processed control path of program 28. In some embodiments, solver 40 also outputs the particular execution in which the program error was found, in order to assist in finding and correcting the error.

In some embodiments, the method terminates once a program error is found. In these embodiments, if solver 40 finds a satisfying assignment, processor 24 outputs the result, at an output step 96, and the method terminates. In alternative embodiments, once an error is found, engine 36 records this error, often together with additional data relevant to its context (such as the violated property and/or data of the particular execution causing the error). Then, the method continues to look for additional program errors, either in the same control path or in other control paths.

After adding the applicable constraint to the path formula in the present control state, engine 36 checks whether the entire control path has been traversed, at a path completion checking step 92. If there are remaining control states to be traversed along the current control path, the method loops back to step 76 above to select the next control state.

If the entire control path has been traversed, engine 36 checks whether the entire control graph 52 has been traversed, at a graph completion checking step 94. If there are remaining control paths to traverse, the method loops back to path selection step 72 above to select the next control path. Otherwise, processor 24 outputs the result at output step 96, and the method terminates.

As noted above, a particular control path being traversed may comprise two or more assert(cond) statements. In such cases, engine 36 does not accumulate the corresponding verification property constraints into the path formula, as described in step 84 above. In some embodiments, for each assert(cond) statement found, engine 36 constructs a temporary path formula. The temporary path formula comprises a conjunction of the currently-existing formula with the !(cond) term of the assert(cond) statement in question. The temporary path formula is then provided to the SAT solver in order to verify the control path prefix that precedes the assert (cond) statement. When continuing to traverse the control path, only newly-encountered assert(cond) statements are considered.

As can be appreciated from the method description, the method of FIG. 4 implicitly "unrolls" loops and recursions, since both loops and recursions are represented as sequences of control states when traversing the control graph of the program. Unlike some known symbolic verification methods that require a fixed upper bound to be defined for the maximum number of loop and recursion iterations, the method of FIG. 4 does not require such a bound.

In some cases, the code of program 28 can be modified so as to reduce the number of control paths in the control graph, without affecting the functionality of the program. As a result, fewer paths are traversed, and the verification time can be reduced. For example, consider the following code:

```
if (expression) {
    x=0;
} else {
    x=1;
}
```

This code can be replaced by the equivalent single instruction:

```
x=expression?0:1;
```

Although the two alternatives are identical in terms of functionality, the single instruction translates to a single control path with a symbolic value. Such code modifications are particularly effective when the code in question is located inside a loop.

Another example in which code modification reduces the complexity of the control graph refers to loops having a non-deterministic number of iterations. For example, consider the following code that initializes an array having a non-deterministic size entered by the user:

```
size=input( );
for (int j=0;j<size;j++) {
    array[j]=0;
}
```

When representing the code above as a control graph, each number of iterations is represented by a different control path. The code above can be replaced with the following equivalent code:

```
for (j=0; j<N; j++)
    a[j]=(j<i)?0:a[j];
for (j=N; j<i; j++)
    a[j]=0;
```

The equivalent code groups together all execution sequences having N iterations or less into a single control path, thus producing a control graph which is typically much simpler to verify.

In some embodiments, the performance of hybrid verification processor 24 can be improved by combining two or more path formulas into a single combined formula, and invoking the SAT solver to solve the combined formula. (In general terms, the verification performance can be improved by combining the symbolic representations of two or more equivalence classes and then evaluating the combined representation.)

In some cases, evaluating the combined formula requires fewer computations than evaluating each path formula separately. For example, in many cases two or more control paths have common sections (i.e., the paths have some sections in which they follow the same control flow, while at other execution stages they diverge into separate flows). In such cases, the path formulas of these paths will typically comprise common constraints. Combining the path formulas of these paths into a single formula enables the SAT solver, in some cases, to evaluate the common constraints only once, thus increasing the efficiency of the computation.

Control Path Transversal Using Representative Assignments

In the method of FIG. 4 above, verification engine 36 traverses the control paths of control graph 52. In some cases, however, a theoretical control path that exists in the graph is never actually used by any execution sequence, for example because it contains contradicting logical conditions. Such a path is referred to hereinbelow as an unused control path. For example, consider the control path {1,2,3,4,5,14,15,16} of the exemplary program 28, referred to as PATH3:

| PATH3 (SSA) | 1 | a1 = 5; |
|---|---|---|
| | 2 | b1 = 0; |
| | 3 | if (a1 > 0){ |
| | 4 | a2 = input( ); |
| | 5 | if (a2 <= 1){ |
| | 14 | } |
| | 15 | if (a2 <= 1) { |
| | 16 | a3 = 2; |

In order for PATH3 to be taken, the two conditions (a2<=1) and ! (a2 <=1) should both hold simultaneously, which is of course impossible. It is evident that no execution sequence will ever follow the control flow of PATH3. When carrying out the verification method of FIG. 4 above, verifying unused control paths adds an unnecessary computational burden on engine 36 and on solver 40, since no program execution sequence will ever follow these paths. Thus, it is generally desirable to prevent engine 36 from traversing and verifying unused control paths. In some embodiments, engine 36 avoids the transversal of unused control paths by selecting control paths to be traversed using representative value assignments.

FIG. 5 is a flow chart that schematically illustrates a method for traversing a control graph using representative value assignments, in accordance with an embodiment of the present invention. The method begins with verification engine 36 detecting a non-deterministic assignment when traversing the control graph of program 28, at an non-deterministic assignment step 100. Non-deterministic assignment may comprise, for example a value assignment to a variable using input accepted from the user, such as the a=input( ); statement in line 4. Another example of a non-deterministic assignment is a value that is evaluated from another symbolic, non-deterministic value.

As noted above, such a value assignment is considered to assign a symbolic value since the user can cause different values to be assigned in different execution sequences. In some embodiments, in addition to considering the assignment as symbolic, engine 36 assigns a specific numeric value (referred to herein as a representative value) to the symbolic variable in question, at a representative assignment step 102. In some embodiments, the representative value is chosen at random. Alternatively, any other suitable method of choosing the representative value can be used. When previous representative values have already been assigned to other variables, the representative value is chosen under the constraints of the previous representative assignments.

Engine 36 records the representative value assigned to the variable and continues to traverse the control graph. In some cases, further down the control graph, the engine encounters a conditional control flow statement (e.g., an if statement) whose condition depends on the symbolic value of step 102 above. Engine 36 detects this conditional control flow statement, at a conditional detection step 104. The engine now has two or more options for continuing its traversal of the control graph, i.e., two or more alternative control paths that diverge from the conditional control flow statement.

Engine 36 determines which of the alternative control paths to traverse, at a path decision step 106. In some embodiments, engine 36 evaluates the condition of the conditional control flow statement using the representative value assigned at step 102 above, and chooses between the two or more alternative control paths based on the evaluated condition.

Although steps 100-106 are shown as a single sequence, this sequence of steps is often executed repeatedly. Whenever a non-deterministic value assignment is detected, a representative value is chosen. Whenever a control flow statement using this value is found, the representative value is used to determine the desired branch. The entire process is applied in a cyclic manner.

The process of detecting a non-deterministic assignment, assigning a representative value and using the representative value in subsequent control path selections may involve any number of variables and any number of control flow statements in the control graph. Since the control path selection is based on a valid value assignment to the program variables, engine 36 can never select and traverse an unused control path.

Although the method of FIG. 5 was described in the context of selecting control paths in a control graph of a verified computer program, the principle of using representative value assignments can be used in other graph traversal applications, such as, for example symbolic execution applications.

In some embodiments, it is desirable for engine 36 to backtrack its traversal of the control graph and start exploring a different control path. Backtracking may be used, for example, when engine 36 completed verifying a particular control path and is now ready to begin exploring another path. Alternatively, in some embodiments engine 36 heuristically decides to abandon a particular control and switch to another path. In some embodiments, in order to switch to a new control path, engine 36 uses SAT solver 40 to calculate a representative value assignment that will cause the new control path to be traversed. The method is graphically explained using an exemplary control graph illustrated in FIG. 6 below.

FIG. 6 is a state diagram that schematically illustrates an exemplary control graph 52, in accordance with an embodiment of the present invention. Assume that engine 36 completed traversing a previous control path 108, starting from a control state 110 and ending at a control state 112. Assume that engine 36 decides to backtrack, or switch, to a new control path 114, starting at state 110 and ending at a control state 116.

It can be seen that control path 108 has the control flow constraints cond1∧cond2, whereas control path 114 has the control flow constraints cond1∧!(cond2). When using a path selection method such as the method of FIG. 5 above, engine 36 should calculate appropriate representative values of the symbolic variables that will cause it to switch from path 108 to path 114. In some embodiments, engine 36 invokes SAT solver 40 to calculate the desired representative values.

The formula provided to the solver should include the control flow constraints of the new control path (the term cond1∧! (cond2) in the present example). In addition, if the control states common to the previous and new paths comprise any value assignment constraints, the formula should include these constraints, as well. Any satisfying value assignment found by solver 40 to this formula can be used as a representative value assignment.

As another example, assume engine 36 completed traversing control path PATH1 defined above, and decides to backtrack to control path {1,2,3,4,5,6,7,8,11,12} of the exemplary program 28, denoted PATH4:

| PATH4 | 1 | a1 = 5; |
| (SSA) | 2 | b1 = 0; |
|  | 3 | if (a1 > 0){ |
|  | 4 | a2 = input( ); |
|  | 5 | if (a2 <= 1){ |
|  | 6 | c1 = a2 + 2; |
|  | 7 | a3 = input( ) |
|  | 8 | if (a3 > 4) { |
|  | 11 | else { |
|  | 12 | b2 = 1; |

In this example, engine 36 provides the formula (a2<1)∧!(a3>4)∧(c1=a2+2)∧(a1=5)∧(b1=0), defining the control flow and value assignment constraints of PATH4, to the SAT solver in order to calculate the appropriate representative values.

Verifying Concurrent Programs

The embodiments described hereinabove mainly referred to the verification of a sequential computer program, which is represented by a single control graph. The disclosed methods and systems can be used to verify concurrent computer programs, as well. In general, a concurrent program comprises two or more threads, whose processing is typically scheduled by an operating system.

In some embodiments, program 28 comprises a concurrent software program. Program 28 comprises N threads denoted $T_1, \ldots, T_N$. Each thread is individually represented by a control graph. In some embodiments, the entire concurrent program 28 is represented by a control graph, similar in structure to control graph 52, which combines the individual thread control graphs. Each control path of the combined control graph corresponds to an execution sequence of all the threads, in the order in which they are scheduled. In other words, the control graph of program 28 typically comprises multiple control paths that differ from one another by the scheduling of instructions from different threads.

For example, assume that program 28 comprises two threads denoted X and Y, wherein thread X comprises the instructions {X1,X2,X3,X4} and thread Y comprises the instructions {Y1,Y2,Y3,Y4}. Control graph 52 of this program 28 comprises multiple control paths 56 that correspond to the different possible scheduling sequences of threads X and Y. Such control paths comprise, for example, the paths {X1,X2,X3,Y1,Y2,X4,Y3,Y4} and {X1,Y1,Y2,X2,X3,Y3,Y4,X4}, as well as many other interleavings of threads X and Y. In addition, of course, different control flows within each thread are also represented as different control paths, as in the case of sequential programs.

Once the concurrent program 28 is represented as a control graph in the manner described above, the methods of FIGS.

4-6 above can be applied to this program in the same way they are applied to sequential programs.

In many practical cases, the control graph of a concurrent program may be very large because of the different scheduling sequences. The size of the control graph may increase the verification time significantly. In some embodiments, the size of the control graph may be reduced by limiting the maximum number of thread switching operations allowed in any single execution sequence. As shown, for example, in the paper by Rabinovitz and Grumberg cited above, this limitation significantly reduces the size of the control graph without significantly degrading the verification performance.

In some embodiments, the control graph can be further simplified by applying partial order reduction (POR) methods and/or symmetry reduction methods, as are known in the art. Such methods may significantly reduce the number of control paths in the graph.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A computer-implemented method for verification, comprising:
defining a specification comprising properties applicable to a target system;
grouping execution sequences of the target system into multiple equivalence classes, each of the equivalence classes containing a respective subset of the execution sequences having a respective common control flow;
identifying one or more of the equivalence classes that contain respective subsets of the execution sequences that are potentially executed by the target system by traversing a graph representing the execution sequences using assignments of representative values to variables; and
for at least one of the identified equivalence classes, simultaneously verifying all the execution sequences in the equivalence class by evaluating a symbolic representation of the equivalence class so as to verify a compliance of the target system with the specification.

2. The method according to claim 1, wherein identifying the one or more of the equivalence classes comprises avoiding verification of at least one other equivalence class that is never executed by the target system.

3. The method according to claim 1, wherein the target system comprises a computer software program.

4. The method according to claim 1, wherein the symbolic representation comprises a logical formula, wherein grouping the execution sequences comprises constructing the logical formula, responsively to instructions of the common control flow, such that satisfaction of the logical formula is indicative that the target system violates at least one of the properties, and wherein evaluating the symbolic representation comprises attempting to find an assignment of variables associated with the target system that satisfies the logical formula and violates the at least one of the properties.

5. The method according to claim 4, wherein constructing the logical formula comprises adding to the formula at least one constraint selected from a group of constraints consisting of control flow constraints related to control flow instructions in the common control flow, variable value assignment constraints related to value assignment instructions in the common control flow, and verification property constraints related to at least one of the properties.

6. The method according to claim 1, wherein the symbolic representation comprises one or more constraints defined over variables of the target system, and wherein evaluating the symbolic representation comprises omitting from the symbolic representation at least one constraint related to an explicit value having a constant value within the set of the execution sequences, so as to simplify the symbolic representation.

7. The method according to claim 1, wherein identifying the one or more of the equivalence classes comprises:
detecting an instruction comprising an assignment of a non-deterministic value to a variable;
assigning a representative numerical value to the variable; and
when detecting a subsequent conditional control flow instruction related to the variable, determining the common control flow of the equivalence class responsively to the representative numerical value.

8. The method according to claim 1, wherein grouping the execution sequences comprises switching from a currently-verified control flow to a new control flow to be verified by:
constructing a logical formula comprising constraints related to the new control flow to be verified, the constraints defined over variables of the target system;
evaluating the formula so as to produce the representative values of the variables; and
determining the new control flow to be verified responsively to the representative values.

9. The method according to claim 1, wherein the graph comprises control paths that correspond to control flows of the target system.

10. The method according to claim 9, wherein the target system comprises a concurrent computer program comprising two or more threads scheduled in alternation, and comprising representing the two or more threads as respective thread control graphs, and combining the two or more thread control graphs to produce a combined control graph representing the control flows of the concurrent software program.

11. The method according to claim 1, wherein evaluating the symbolic representation comprises solving a satisfiability problem over the equivalence class.

12. The method according to claim 1, wherein evaluating the symbolic representation comprises combining symbolic representations of two or more equivalence classes to produce a combined symbolic representation and evaluating the combined symbolic representation so as to jointly verify the two or more equivalence classes.

13. Apparatus for verifying a target system, comprising:
a memory, which is arranged to hold a model of the target system and a specification comprising properties applicable to the target system; and
a processor, which is arranged to group execution sequences of the target system into multiple equivalence classes, each of the equivalence classes containing a respective subset of the execution sequences having a respective common control flow, to identify one or more of the equivalence classes that contain respective subsets of the execution sequences that are potentially executed by the target system by traversing a graph representing the execution sequences using assignments of representative values to variables, and, for at least one of the identified equivalence classes, to simultaneously verify all the execution sequences in the equivalence class by evaluating a symbolic representation of the equivalence class so as to verify a compliance of the target system with the specification.

14. The apparatus according to claim 13, wherein the target system comprises a computer software program.

15. The apparatus according to claim 13, wherein the symbolic representation comprises a logical formula, and wherein the processor is arranged to construct the logical formula responsively to instructions of the common control flow, such that satisfaction of the logical formula is indicative that the target system violates at least one of the properties, and to attempt to find an assignment of variables associated with the target system that satisfies the logical formula and violates the at least one of the properties.

16. The apparatus according to claim 15, wherein the processor is arranged to construct the logical formula by adding to the formula at least one constraint selected from a group of constraints consisting of control flow constraints related to control flow instructions in the common control flow, variable value assignment constraints related to value assignment instructions in the common control flow, and verification property constraints related to at least one of the properties.

17. The apparatus according to claim 13, wherein the processor is arranged to identify the equivalence class by:
  detecting an instruction comprising an assignment of a non-deterministic value to a variable;
  assigning a representative numerical value to the variable; and
  when detecting a subsequent conditional control flow instruction related to the variable, determining the common control flow of the equivalence class responsively to the representative numerical value.

18. The apparatus according to claim 13, wherein the target system comprises a concurrent computer program comprising two or more threads scheduled in alternation, wherein the two or more threads are represented as respective two or more thread control graphs comprising control paths that correspond to control flows of the two or more threads, and wherein the processor is arranged to combine the two or more thread control graphs to produce a combined control graph representing control flows of the concurrent software program.

19. The apparatus according to claim 13, wherein the processor is arranged to solve a satisfiability problem over the equivalence class so as to evaluate the symbolic representation.

20. The apparatus according to claim 13, wherein the processor is arranged to avoid verification of at least one other equivalence class that is never executed by the target system.

21. A computer software product for verifying a target system, the product comprising a tangible non-transitory computer-readable medium, in which program instructions are stored, which instructions, when read by a computer, cause the computer to accept a model of the target system and a specification comprising properties applicable to the target system, to group execution sequences of the target system into multiple equivalence classes, each of the equivalence classes containing a respective subset of the execution sequences having a respective common control flow, to identify one or more of the equivalence classes that contain respective subsets of the execution sequences that are potentially executed by the target system by traversing a graph representing the execution sequences using assignments of representative values to variables, and, for at least one of the identified equivalence classes, to simultaneously verify all the execution sequences in the equivalence class by evaluating a symbolic representation of the equivalence class so as to verify a compliance of the target system with the specification.

* * * * *